United States Patent
Hines et al.

(10) Patent No.: US 12,463,437 B2
(45) Date of Patent: *Nov. 4, 2025

(54) BATTERY PACK WITH TEMPERATURE LIMITED CURRENT

(71) Applicant: TECHTRONIC CORDLESS GP, Anderson, SC (US)

(72) Inventors: Colin Hines, Easley, SC (US); Clayton Brutus, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,823

(22) Filed: Jun. 17, 2024

(65) Prior Publication Data

US 2024/0413648 A1 Dec. 12, 2024

Related U.S. Application Data (63) Continuation of application No. 17/084,982, filed on Oct. 30, 2020, now Pat. No. 12,015,290.

(51) Int. Cl.
*H01M 10/44* (2006.01)
*H02J 7/00* (2006.01)

(52) U.S. Cl.
CPC ....... *H02J 7/00309* (2020.01); *H01M 10/443* (2013.01); *H02J 7/0013* (2013.01);
(Continued)

(58) Field of Classification Search
CPC ............ H02J 7/00309; H02J 7/007194; H02J 7/00714; H02J 7/0013; H02J 7/0045; H01M 10/443
See application file for complete search history.

(56) References Cited

U.S. PATENT DOCUMENTS

| 5,166,596 A | 11/1992 | Goedken |
| 6,204,641 B1 | 3/2001 | Sakakibara |

(Continued)

FOREIGN PATENT DOCUMENTS

| EP | 2660945 A1 | 11/2013 |
| EP | 3051622 A1 | 8/2016 |

(Continued)

*Primary Examiner* — Julian D Huffman
*Assistant Examiner* — Pamela J Jeppson
(74) *Attorney, Agent, or Firm* — Dority & Manning, P.A.

(57) ABSTRACT

A battery pack can include one or more cells. The battery pack can include at least one temperature sensor configured to obtain a temperature measurement indicative of a temperature of at least cell of the one or more cells. The battery pack can include a controller, the controller configured to be placed in signal communication with a battery charger. The controller can be configured to perform operations. The operations can include obtaining the temperature measurement from the at least one temperature sensor. The operations can include determining, based at least in part on the temperature measurement, that the temperature of the at least one cell is between a lower temperature threshold and an upper temperature threshold. The operations can include, in response to determining that the temperature of the at least one cell is between the lower temperature threshold and the upper temperature threshold, reducing a maximum charging current, wherein reducing the maximum charging current comprises reducing the maximum charging current based at least in part on an inverse functional relationship between the temperature measurement and the maximum charging current. The operations can include controlling the battery charger based at least in part on the maximum charging current to charge the one or more cells.

18 Claims, 6 Drawing Sheets

(52) U.S. Cl.
CPC ........ *H02J 7/0045* (2013.01); *H02J 7/00714* (2020.01); *H02J 7/007194* (2020.01)

(56) References Cited

U.S. PATENT DOCUMENTS

| | | |
|---|---|---|
| 7,446,508 B2 | 11/2008 | Aradachi et al. |
| 7,656,131 B2 | 2/2010 | Embrey et al. |
| 8,040,110 B2 | 10/2011 | Al-Anbuky et al. |
| 8,203,314 B2 | 6/2012 | Odaohhara et al. |
| 8,305,044 B2 | 11/2012 | Kawamoto et al. |
| 9,197,097 B2 | 11/2015 | Liu et al. |
| 9,225,190 B2 | 12/2015 | Labbe et al. |
| 9,276,417 B2 | 3/2016 | Yoshida |
| 9,300,157 B2 | 3/2016 | Bergqvist et al. |
| 9,356,461 B2 | 5/2016 | Howard et al. |
| 9,608,468 B2 | 3/2017 | Kikuchi et al. |
| 9,634,513 B2 | 4/2017 | Tokutake |
| 9,855,855 B1 | 1/2018 | Cory et al. |
| 10,186,887 B2 | 1/2019 | Wang et al. |
| 10,491,039 B2 | 11/2019 | Ting et al. |
| 10,666,081 B2 | 5/2020 | Irish et al. |
| 10,670,469 B2 | 6/2020 | Ryu et al. |
| 10,714,948 B2 | 7/2020 | Meyer et al. |
| 2004/0145352 A1 | 7/2004 | Harrison |
| 2008/0024089 A1 | 1/2008 | Meng et al. |
| 2008/0197813 A1 | 8/2008 | Asakura et al. |
| 2009/0243540 A1 | 10/2009 | Choi et al. |
| 2012/0139482 A1 | 6/2012 | Zhang et al. |
| 2017/0250548 A1 | 8/2017 | Eo et al. |
| 2017/0294787 A1 | 10/2017 | Taga et al. |
| 2018/0003773 A1 | 1/2018 | Umemura et al. |
| 2018/0191183 A1 | 7/2018 | Namiki et al. |
| 2019/0036373 A1 | 1/2019 | Shimura |
| 2022/0140635 A1 | 5/2022 | Hines et al. |

FOREIGN PATENT DOCUMENTS

| | | |
|---|---|---|
| EP | 2965399 B1 | 9/2019 |
| EP | 3641046 A1 | 4/2020 |
| JP | H05328629 A | 12/1993 |
| JP | 2005528070 A | 9/2005 |
| JP | 2009219221 A | 9/2009 |
| WO | WO2019092397 A1 | 5/2019 |

BATTERY PACK WITH TEMPERATURE LIMITED CURRENT

PRIORITY CLAIM

The present application is a continuation of and claims the benefit of priority to U.S. patent application Ser. No. 17/084,982, titled "Battery Pack with Temperature Limited Current," having a filing date of Oct. 30, 2020, which is incorporated herein by reference in its entirety.

FIELD

Example aspects of the present disclosure relate to an electrical energy storage device, such as a battery pack including multiple battery cells and systems and methods for charging thereof.

BACKGROUND

Battery packs are commonly used in portable electrical equipment and tools, so that these equipment and tools can be used in environments where no fixed power supply is available. For example, power tools manufacturers often manufacture a universal power pack which can be compatibly used in different types of cordless power tools, such as electric drills, hammers, screwdrivers, impact wrenches, angle grinders, etc. The battery packs usually include a plurality of battery cells accommodated in an integral housing where the user can easily install the entire battery into the power tool, or remove it therefrom via latching mechanisms configured on the battery pack housing and/or the power tool.

SUMMARY

Aspects and advantages of embodiments of the present disclosure will be set forth in part in the following description, or can be learned from the description, or can be learned through practice of the embodiments.

One example aspect of the present disclosure is directed to a battery pack. The battery pack can include one or more cells. The battery pack can include at least one temperature sensor configured to obtain a temperature measurement indicative of a temperature of at least cell of the one or more cells. The battery pack can include a controller, the controller configured to be placed in signal communication with a battery charger. The controller can be configured to perform operations. The operations can include obtaining the temperature measurement from the at least one temperature sensor. The operations can include determining, based at least in part on the temperature measurement, that the temperature of the at least one cell is between a lower temperature threshold and an upper temperature threshold. The operations can include, in response to determining that the temperature of the at least one cell is between the lower temperature threshold and the upper temperature threshold, reducing a maximum charging current, wherein reducing the maximum charging current comprises reducing the maximum charging current based at least in part on an inverse functional relationship between the temperature measurement and the maximum charging current. The operations can include controlling the battery charger based at least in part on the maximum charging current to charge the one or more cells.

Another example aspect of the present disclosure is directed to a method for charging a battery pack while avoiding an over-temperature condition. The method can include obtaining a temperature measurement indicative of a temperature of at least one cell from the at least one temperature sensor. The method can include determining, based at least in part on the temperature measurement, that the temperature of the at least one cell is between a lower temperature threshold and an upper temperature threshold. The method can include, in response to determining that the temperature of the at least one cell is between the lower temperature threshold and the upper temperature threshold, reducing a maximum charging current, wherein reducing the maximum charging current comprises reducing the maximum charging current based at least in part on an inverse functional relationship between the temperature measurement and the maximum charging current. The method can include controlling a battery charger based at least in part on the maximum charging current to charge the at least one cell.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF FIGURES

In the drawings, like numerals indicate like parts throughout the several embodiments described herein.

DETAILED DESCRIPTION OF THE PREFERRED EMBODIMENTS

In the claims which follow and in the preceding description of the example aspects of the present disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the example aspects of the present disclosure.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of illustration of example embodiments in normal in-use orientation and are not intended to limit the disclosure to any particular orientation.

Example aspects of the present disclosure are directed to a battery pack. The battery pack can include one or more cells. The one or more cells can store and/or transfer charge (e.g., as power) to power electrical devices, such as electric tools, garden tools, etc. Battery packs may be configured to have various DC voltage levels (e.g., 12 volts, 18 volts, 24 volts, 28 volts, 40 volts, etc.). For example, the battery packs can be 12 volt battery packs, 28 volt battery packs, 40 volt battery packs, or another voltage. In an example, the battery packs can include one or more lithium-ion (Li-ion) cells arranged to output direct current at a voltage rating of the battery pack. In some embodiments, electrodes of the cells can be or can include graphite electrodes. Other suitable materials may be included in the electrodes of the cells.

In some embodiments, the battery cells in the battery packs can be rechargeable lithium-ion cells. In other constructions, the battery cells may have a chemistry other than lithium-ion such as, for example, nickel cadmium (NiCa or NiCad), nickel metal-hydride, and the like. In one embodiment, the batteries are power tool battery packs including a pack housing containing one or more battery cells and latching mechanisms for selectively securing the battery packs to the battery interfaces.

Furthermore, the battery pack including the one or more cells can be charged and/or recharged by a battery charger. For instance, the battery pack can be connected to a battery charger that is configured to receive the battery pack, such as configured to accept the battery pack into a battery receptacle. As one example, the battery pack can include one or more slot mechanical connectors (e.g., rails) configured to engage with one or more slots at the battery charger to couple the battery pack to the battery charger. When the battery pack is connected to the battery charger, the battery charger can supply power (e.g., voltage and/or current) to the battery pack (e.g., to the one or more cells) to charge the battery by increasing charge of the cell(s). In some embodiments, the battery pack and/or battery charger can be configured in a constant voltage mode that supplies a constant voltage to the battery back, such as by decreasing current over time to maintain a constant (e.g., specified) voltage as the battery charges. Additionally and/or alternatively, the battery pack and/or battery charger can be configured in a constant current mode that supplies a constant (e.g., specified) current to the battery pack. This generally causes voltage of the battery pack (e.g., cell voltage) to increase with charge.

The battery pack can include a battery controller. The battery controller can be placed in signal communication with the battery charger, such as with a charger controller of the battery charger. For example, the battery controller can be coupled (e.g., by one or more signal pins and/or other terminals) to the charger controller when the battery pack is received by the battery charger. The battery controller can request an amount of current from the battery charger to charge the battery. For example, the battery controller can communicate data indicative of a requested amount of current to be provided by the battery charger to the charger controller. The charger controller can control the battery charger to provide the requested amount of current to the battery. In some embodiments, the requested amount of current can be an upper current limit. For instance, the charger may deliver an amount of current that is less than or equal to the upper current limit. For example, if a battery pack communicates a request for 6 amps to a battery charger that is only capable of providing 4 amps, the battery charger may provide only 4 amps. However, if the battery pack communicates a request for 2 amps to the same 4 amp battery charger, the battery charger may provide 2 amps. In this way, the battery pack can intelligently limit the amount of current it receives while having compatibility with various chargers.

Generally, battery packs can be subject to temperature constraints. For instance, it can be necessary to maintain a battery pack at or below an upper temperature limit. Temperature of the battery can increase during use and/or charging. Exceeding the upper temperature limit, resulting in an over-temperature condition, can cause complications such as safety risks, reduction of battery life, damage to the battery and/or other systems, and/or other complications. Additionally, in the event of an over-temperature condition, it can be necessary to mitigate the over-temperature condition such as by halting charging until the battery pack has returned to a lower temperature. This can significantly increase an amount of time required to charge the battery pack. As such, it is generally desirable to avoid over-temperature conditions by maintaining a battery pack at or below an upper temperature limit and/or avoiding exceeding an upper temperature limit.

According to example aspects of the present disclosure, the battery controller can monitor a temperature of the battery pack. As one example, the battery controller can monitor temperature of the cell(s) of the battery pack. For instance, in some embodiments, the battery pack can include one or more temperature sensors respective to at least one cell. The temperature sensor(s) can obtain a temperature measurement from the at least one cell. The battery controller can obtain the temperature measurement from the temperature sensor(s).

In some embodiments, the temperature measurement may be made available to the battery charger. For instance, in some embodiments, the temperature measurement may be available at a temperature measurement terminal at the battery pack. For instance, when the battery pack is received at a device (e.g., the battery charger), the temperature measurement terminal may convey a temperature measurement signal (e.g., a digital and/or analog signal) that is descriptive of the temperature measurement to the device to which the battery pack is coupled (e.g., the battery charger).

According to example aspects of the present disclosure, a battery controller can be configured to perform operations. The operations can include, for example, a method for charging a battery pack while avoiding an over-temperature condition. For instance, according to example aspects of the present disclosure, the battery controller can implement the operations to charge the battery while preventing the over-temperature condition. Furthermore, in the event that the over-temperature condition occurs regardless, the operations can, in some embodiments, contribute to mitigating the over-temperature condition.

The method can include obtaining a temperature measurement indicative of a temperature of at least one cell from a temperature sensor. The temperature measurement can be indicative of a temperature of the battery pack (e.g., a temperature of the at least one cell). The temperature measurement can be communicated to the battery controller. In one example embodiment, a single temperature sensor is configured to obtain a temperature measurement of one cell to determine the temperature of the battery pack. For example, the temperature measurement of a single cell can be extrapolated to represent the temperature of the battery pack. Other suitable temperature measurement configurations may be employed in accordance with example embodiments of the present disclosure.

The method can include determining, based at least in part on the temperature measurement, that the temperature of the at least one cell is between a lower temperature threshold and an upper temperature threshold. For instance, the lower temperature threshold can be at a temperature at which it becomes desirable to begin reducing current to the battery pack to avoid the over-temperature condition. Generally, the lower temperature threshold can be any suitable temperature and may be a temperature that is less than (e.g., about 10 degrees Celsius less than) the upper temperature threshold. Furthermore, in some embodiments, the upper temperature threshold can be at an upper temperature limit, such as a temperature at which an over-temperature condition occurs. The battery controller can determine that the temperature of the at least one cell is between a lower temperature threshold and an upper temperature threshold in any suitable manner, such as, for example, by a threshold comparison. Additionally and/or alternatively, the determination may be performed as a result of inputting the temperature into a mathematical model.

Additionally and/or alternatively, the method can include, in response to determining that the temperature of the at least one cell is between the lower temperature threshold and the upper temperature threshold, reducing a maximum charging current. For instance, reducing the maximum charging current can include reducing a maximum charging current that is requested from a battery charger (e.g., by a charging current request). According to example aspects of the present disclosure, reducing the maximum charging current can include reducing the maximum charging current based at least in part on an inverse functional relationship between the temperature measurement and the maximum charging current. For instance, the inverse functional relationship can provide that a maximum charging current will decrease as temperature of the at least one cell increases over at least a portion of the region from the lower temperature threshold to the upper temperature threshold. For instance, the inverse functional relationship can provide that a maximum charging current at the upper temperature threshold is less than at least a maximum charging current at the lower temperature threshold. Additionally and/or alternatively, the maximum charging current can be allowed to recover (e.g., increase) as the temperature decreases (e.g., after reducing the current). In some embodiments, the inverse functional relationship can be a monotonically decreasing relationship. For example, in some embodiments, the inverse functional relationship can be a linearly decreasing relationship. For example, the maximum charging current can decrease linearly with respect to increasing temperature. Other suitable functional relationships can be employed in accordance with example aspects of the present disclosure, such as an exponentially decreasing function, step function, etc.

In some embodiments, the inverse functional relationship can be or can include a mathematical model or function. For example, a computing system can compute the maximum charging current based on a formula or mathematical model. As another example, the inverse functional relationship can be or can include a lookup table. For example, the maximum charging current can be retrieved from a lookup table where temperature is provided to the lookup table as input. Other suitable systems for utilizing an inverse function relationship (e.g., thresholding) can be employed in accordance with example aspects of the present disclosure. As one example, the maximum charging current can be determined with respect to a temperature-based current limit from a temperature current-curve. The temperature-current curve can be stored in non-transitory computer-readable media, such as, for example, flash memory, RAM, ROM, EEPROM, hard disk memory, solid state memory, and/or any other suitable memory. For instance, in some embodiments, the curve can be stored as a lookup table, mathematical relationship or model, or other suitable representation.

In some embodiments, the maximum charging current can be based on various other current limits established with respect to other factors of the battery pack. For example, the current limit(s) can be established by various criteria of the battery, such as, but not limited to, state of charge, battery voltage, cell voltage, charging type (e.g., constant current vs. constant voltage), charging status, charging progression, etc. One of these current limits can be established with respect to temperature of the battery pack, such as based on the inverse functional relationship between temperature and charging current. For example, the lowest current limit may be used as the maximum charging current.

Additionally and/or alternatively, the method can include requesting, from the battery charger, the maximum charging current for charging the one or more cells. For instance, in some embodiments, the battery controller can determine a charging current request. The charging current request can specify a requested amount of current to be provided to the battery for charging the battery, such as the maximum charging current. The charging current request can be communicated to the battery charger, such as a charger controller. In some embodiments, the maximum charging current can be periodically requested from the battery charger. For example, the maximum charging current can be requested in periodic intervals, such as at set time intervals, including regular intervals and/or irregular intervals, in response to stimuli, etc. For instance, the maximum charging current may be determined and requested at regular intervals to ensure that the current is updated as necessary.

After receiving the charging current request, the charger controller can configure a battery charger (e.g., a supply) to deliver the amount of current that is specified by the charging current request to the battery pack (e.g., cells). As one example, a battery pack and/or a battery charger can include one or more charging terminals configured to provide electrical connection between the one or more cells and the battery charger, such as between the one or more cells and the supply. In some embodiments, the charging current request is periodically communicated to the battery charger. For example, the charging current request can be communicated at set time intervals, in response to stimuli, etc.

In some embodiments, the battery controller can further be configured to mitigate an over-temperature condition at a battery pack. For instance, example aspects of the present disclosure can generally reduce likelihood of an over-temperature condition, such as by decreasing temperature of the battery pack as a result of reduced current to the battery pack. Despite this, in some example cases, it can still be desirable to entirely halt charging of the battery pack if the over-temperature condition is nonetheless reached.

For instance, the method can further include determining, based at least in part on the temperature measurement, that the temperature of the at least one cell is greater than the upper temperature threshold. For example, the battery controller can compare the temperature of the cell(s) to the upper temperature threshold. If the temperature meets or exceeds the upper temperature threshold, it can be desirable to halt charging the battery pack. For instance, in response to determining that the temperature of the one or more cells is greater than the upper temperature threshold, the method can include halting charging of the battery pack. For instance, halting charging of the battery pack can include requesting a minimus current from the battery charger while charging is halted. The minimus current can be a current that is at or near zero amps, such as less than about 0.1 amps, such as 0 amps. For example, halting charging of the battery pack can include communicating a halt current request to the battery charger, where the halt current request includes a request for about zero amps.

The battery controller can further be configured to determine, subsequent to halting charging of the battery, that the temperature of the at least one cell is less than the lower temperature threshold. For instance, the temperature of the at least one cell being less than the lower temperature threshold can generally be indicative that charging can safely be resumed. In response to determining that the temperature of the one or more cells is less than the lower temperature threshold, the method can include resuming charging of the battery pack. For instance, once the battery pack reaches the lower temperature threshold, the battery controller can resume determining a maximum charging temperature based on a temperature measurement, as described herein.

Some example aspects of the present disclosure may be discussed herein with reference to the battery controller performing operations such as, for example, obtaining a temperature measurement from at least one temperature sensor, determining, based at least in part on the temperature measurement, that the temperature of at least one cell is between a lower temperature threshold and an upper temperature threshold, in response to determining that the temperature of the at least one cell is between the lower temperature threshold and the upper temperature threshold, reducing a maximum charging current, wherein reducing the maximum charging current comprises reducing the maximum charging current based at least in part on an inverse functional relationship between the temperature measurement and the maximum charging current, and requesting, from the battery charger, the maximum charging current for charging the one or more cells for the purposes of illustration. It should be understood that some or all of these steps may be performed at a computing device other than the battery controller, such as, for example, the charger controller. For instance, in some embodiments, the battery pack may communicate the temperature measurement to the battery charger, such as by a communication terminal or communication pin on the battery pack and/or the battery charger. The charger controller may obtain the temperature measurement from the battery pack (e.g., via the terminal) and perform the operations for limiting the maximum charging current at the controller. This can be beneficial in cases where the battery pack is incapable of performing the methods described herein, such as in cases where the battery pack lacks a battery controller, cases providing legacy support for batteries with firmware that cannot be updated, etc.

Example aspects of the present disclosure can provide for a number of technical effects and benefits. As one example, example aspects of the present disclosure can provide for reduced charge time of a battery pack. For instance, it can be necessary to halt charging in the case of a battery pack exceeding an upper temperature limit. Systems and methods according to example aspects of the present disclosure can provide for proactively reducing current from a charger in advance of a battery pack reaching an upper temperature limit, such as the upper temperature limit. In this way, the battery pack can avoid reaching the upper temperature limit, which can in turn prevent time-costly interruptions in charging due to reaching the upper temperature limit. As another example, example aspects of the present disclosure can increase battery life. For instance, example aspects of the present disclosure can maintain a battery at or below an upper temperature limit which can prevent reduction in battery life associated with exceeding the upper temperature limit.

Figure 1:
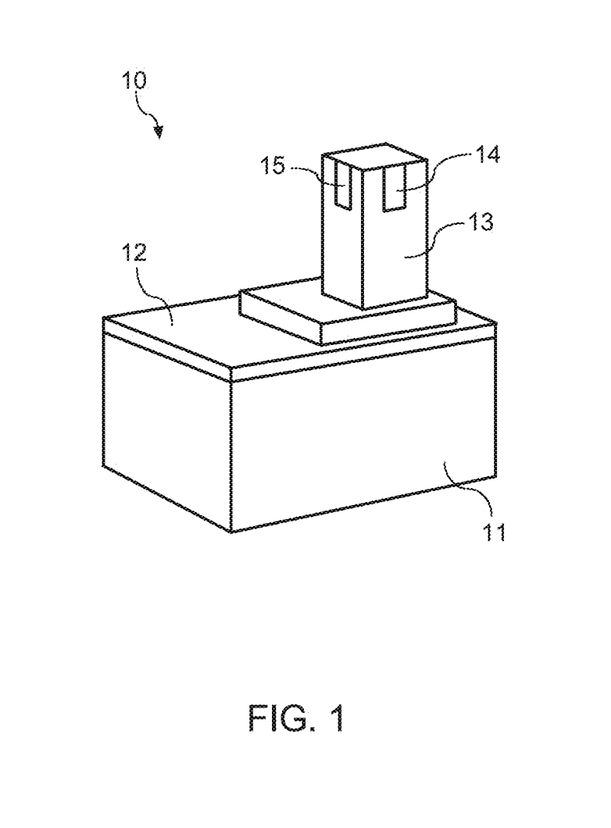
FIG. 1 illustrates an example tool battery according to example embodiments of the present disclosure.
Figure 2:
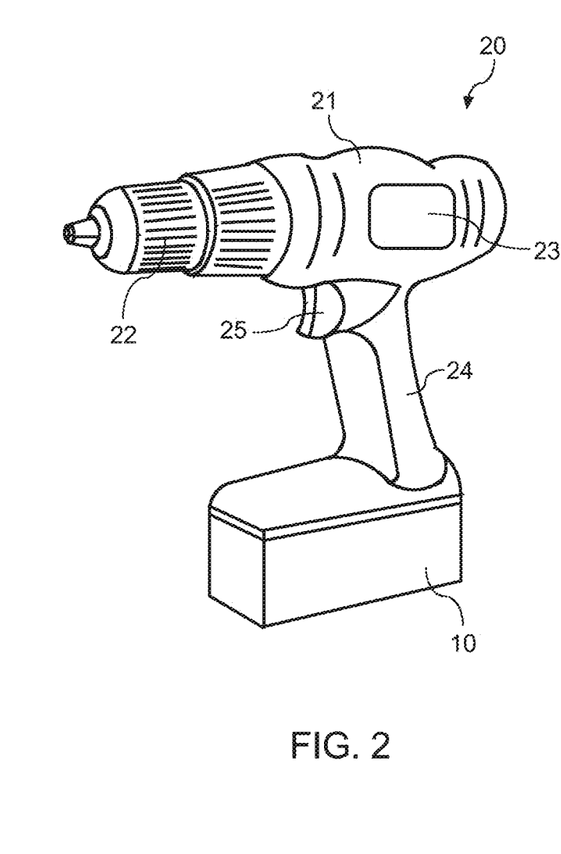
FIG. 2 illustrates an example cordless (battery power) tool according to example embodiments of the present disclosure.

Referring now to the FIGS., example embodiments of the present disclosure will be discussed with reference to the FIGS. for the purposes of illustration. FIGS. 1 and 2 illustrate a typical tool battery 10 and a cordless (battery power) tool 20. The illustrated tool 20 is a drill or driver having a tool housing 21 and a pistol type handle 24. A motor 23 (indicated by broken lines) is located within the housing for driving a tool output 22. A battery 10 is connectable to a supported by the tool handle 24. A tool controller such as a trigger 25 is located adjacent the junction between the housing 21 and handle 24 for coupling energy from the battery 10 to the motor 23. This is, however, not intended to limit the scope of use of a battery according to example aspects of the present disclosure. Such a battery could be used in other types of cordless tools and, in particular, in hand-held cordless tools or in cordless lawn and garden equipment such as lawn mowers, hedge trimmers and the like. Such a battery could also be used in floor care products such as vacuum cleaners, hand-vacs and cordless sweepers.

One embodiment of a battery for such types of cordless tools has a battery pack housing 11 having a mating face 12 for connecting to the tool. The battery housing 11 is selectively receivable with and supportable by the tool housing via battery connection features, and may be selectively separated from the tool for charging in a separate charger (not shown). For instance, one example embodiment of battery mating features is illustrated in FIGS. 1. In the illustrated embodiment the battery connection features are a terminal post 13 and battery terminals 14, 15 on the post 13 for connecting the battery energy sources with the tool controller or trigger 25. In alternative embodiments the battery connection features may be slide-type or rail-type connection features or any other type of battery connection features known in the art. For example, instead of being included at terminal post 13, the battery terminals 14 and 15 may be disposed on the mating face 12 and configured to be mated as the battery 10 is received at tool handle 24 by sliding the battery 10 along one or more rails. Any other suitable battery connection features can be employed according to example embodiments of the present disclosure.

Figure 3:
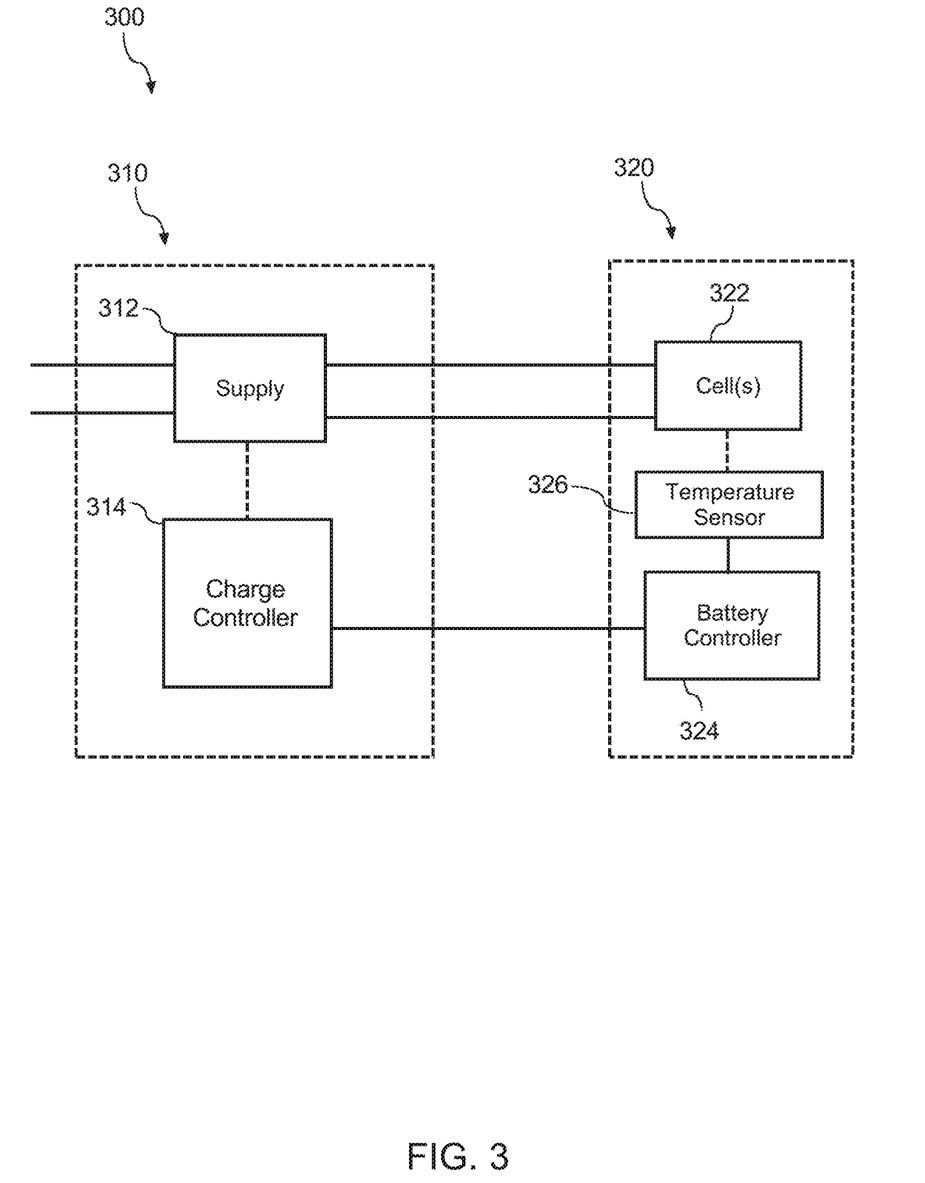
FIG. 3 illustrates a schematic diagram of an example battery pack charging system according to example embodiments of the present disclosure.

FIG. 3 illustrates a schematic diagram of an example battery pack charging system 300 according to example embodiments of the present disclosure. The battery pack charging system 300 can include a battery charger 310. The battery charger 310 can be removably coupled to a battery pack 320. For instance, the battery charger 310 can be configured to receive battery pack 320. As one example, battery charger 310 can receive battery pack 320 at a cavity, slot, and/or other attachment mechanism configured to couple to and/or establish electrical communication (e.g., signal communication) between the battery charger 310 and battery pack 320. As one example, battery pack 320 can include one or more slot mechanical connectors configured to engage with one or more slots at the battery charger 310 to couple the battery pack 320 to the battery charger 310.

The battery pack 320 can include one or more cells 322. The one or more cells 322 can store and/or transfer charge (e.g., as power) to power electrical devices, such as electric tools, garden tools, etc. Furthermore, the one or more cells 322 can be charged and/or recharged by a battery charger 310. For instance, the battery pack 320 can be connected to a battery charger 310 that is configured to receive the battery pack 320, such as configured to accept the battery pack 320 into a battery receptacle. When the battery pack 320 is connected to the battery charger 310, the battery charger 310 can supply power (e.g., voltage and/or current) by a power signal, such as a voltage signal and/or a current signal, to the battery pack 320 (e.g., to the one or more cells 322) to charge the battery by increasing charge of the cell(s). In some embodiments, the battery pack 320 and/or battery charger 310 can be configured in a constant voltage mode that supplies a constant voltage signal to the battery back, such as by decreasing current over time to maintain a constant voltage at the battery charger 310. Additionally and/or alternatively, the battery pack 320 and/or battery charger 310 can be configured in a constant current mode that supplies a constant current signal to the battery pack 320. This generally causes voltage of the battery pack 320 (e.g., cell voltage) to increase with a state of charge.

The battery charger 310 can be configured to charge battery pack 320. For instance, the battery charger 310 can include supply 312. Supply 312 can be configured to supply power by providing a power signal, such as a voltage signal and/or a current signal, to cell(s) 322 of battery pack 320 to charge battery pack 320. For instance, the supply 312 can supply power that is stored in cells 322. The supply 312 can be a DC supply configured to provide a DC power signal, such as a DC supply including an AC/DC converter. For example, supply 312 can receive a first power signal, such as an AC signal, such as an AC signal from a power outlet, etc., and convert the first power signal to a second power signal, such as a DC signal, such as a DC current signal rated for charging battery pack 320.

The battery pack 320 can include a battery controller 324. The battery controller 324 can be placed in signal communication with the battery charger 310, such as with a charger controller 314 of the battery charger 310. For example, the battery controller 324 can be coupled (e.g., by one or more signal pins and/or other terminals) to the charger controller 314 when the battery pack 320 is received by the battery charger 310. The battery controller 324 can request an amount of current from the battery charger 310 to charge the battery. For example, the battery controller 324 can communicate a request for a requested amount of current to be provided by the battery charger 310 to the charger controller 314. The charger controller 314 can control the battery charger 310 to provide the requested amount of current to the battery. For instance, the battery charger 310 and/or battery back 320 can include one or more charging terminals configured to provide electrical connection and/or electrical communication between the one or more cells 322 and the battery charger 310 (e.g., supply 312). The charging terminals can be connectable and/or disconnectable such that the battery pack 320 can be removed from battery charger 310 and/or connected to a device utilizing battery pack 320, such as an electrical tool.

In some embodiments, the requested amount of current can be an upper current limit. For instance, the charger may deliver an amount of current that is less than or equal to the upper current limit. For example, if a battery pack 320 communicates a request for 6 amps to a battery charger 310 that is only capable of providing 4 amps, the battery charger 310 may provide only 4 amps. However, if the battery pack 320 communicates a request for 2 amps to the same 4 amp battery charger 310, the battery charger 310 may provide 2 amps.

Supply 312 can be controlled by charger controller 314. For instance, charger controller 314 can obtain (e.g., from the battery controller 324) and/or otherwise determine an amount of voltage and/or current to be provided to battery pack 320. Charger controller 314 can configure supply 312 to provide the determined amount of voltage and/or current to battery pack 320. For instance, in some embodiments, the charger controller can adjust characteristics of one or more digital signals, such as pulse width modulated (PWM) signals, to configure an amount of current and/or voltage and/or power supplied by the supply 312. For instance, the controller can adjust the voltage and/or current at battery pack 320 by adjusting duty cycle, frequency/period, etc. of one or more pulse width modulation circuits at supply 312. As another example, in some embodiments, charger controller 314 can adjust other components of supply 312, such as variable components, such as variable resistors, varactors, switches, etc., to configure an amount of current and/or voltage and/or power supplied by the supply 312. For example, charger controller 314 can be configured to adjust the power signal from supply 312 (e.g., for charging the cell(s) 322) based at least in part on the maximum charging current (e.g., from battery controller 324) as described herein.

In some embodiments, control of the battery charger 310 may be performed at least partially by another controller than battery controller 324, such as, for example, the charger controller 314. For instance, in some embodiments, the battery pack 320 may communicate the temperature measurement from the temperature sensor 326 directly to the charger controller 314, such as by a temperature measurement terminal on the battery pack 320 and/or the battery charger 310. The charger controller 314 may obtain the temperature measurement (e.g., indirectly) from the temperature sensor 326 (e.g., via the temperature measurement terminal) and control supply 312 based on the temperature measurement, as described herein. This can be beneficial in cases where the battery pack 320 is incapable of performing the methods described herein, such as in cases where the battery pack 320 lacks a battery controller 324, cases providing legacy support for battery packs 320 with firmware (e.g., at battery controller 324) that cannot be updated, etc.

Figure 4:
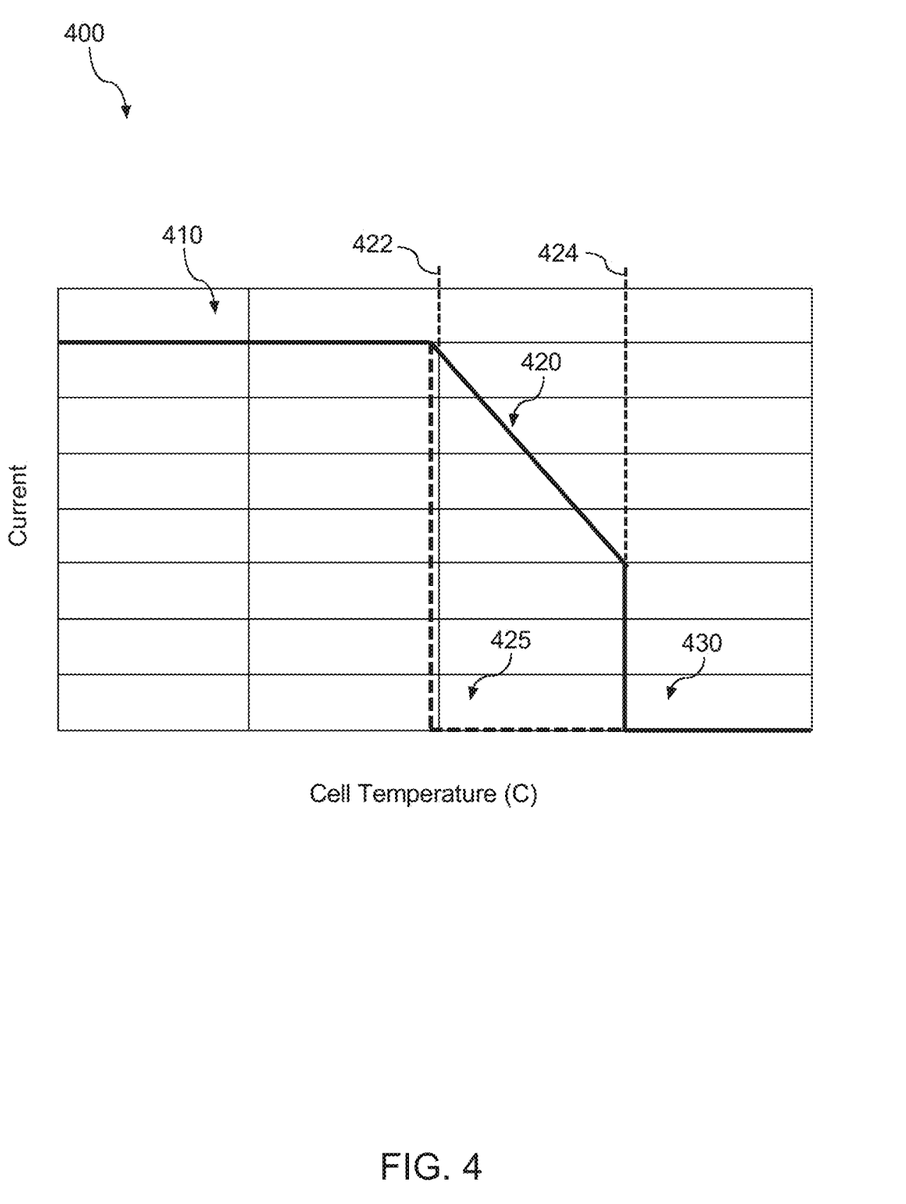
FIG. 4 illustrates an example temperature-current curve according to example embodiments of the present disclosure.

Referring now to FIG. 4, one example temperature-current curve 400 that may be employed in accordance with example aspects of the present disclosure is illustrated. FIG. 4 illustrates an example temperature-current curve 400 according to example embodiments of the present disclosure. Curve 400 can generally describe behavior of some embodiments according to example embodiments of the present disclosure. For instance, accessing the temperature-current curve 400 can be one example of implementing the systems and methods described herein. As other examples, the systems and methods described herein can be implemented by threshold checks, look up tables, mathematical functions and/or models, approximations of curve 400 (e.g., discretized curves), and/or other suitable representations.

The temperature-current curve 400 can include a temperature-invariant region 410, a temperature-inverse region 420, and an over-temperature region 430. For instance, temperature-inverse region 420 can span from lower temperature threshold 422 to upper temperature threshold 424. For instance, the temperature-inverse region 420 can span from a lower temperature threshold at lower temperature threshold 422 to an upper temperature threshold at upper temperature threshold 424. For instance, the temperature-inverse region can span over a portion of the temperature-current curve that is limited by the lower temperature threshold 422 and the upper temperature threshold 424. The temperature-inverse region 420 can define an inverse relationship between temperature and current over the temperature-inverse region 420. For instance, the current can be reduced across the temperature-inverse region 420.

The temperature-invariant region 410 can include some or all temperatures below the lower temperature threshold 422. As illustrated, the current can be constant and/or temperature-invariant within temperature-invariant region 410. For instance, the current limit may be unaffected by temperature in the temperature-invariant region 410. For example, the temperature-invariant region 410 may define a constant value, such as an overall upper current limit on the battery pack 320.

Furthermore, the over-temperature region 430 can include some or all temperatures above the upper temperature threshold (e.g., upper temperature limit) 424. For instance, it can be desirable to maintain the temperature of a battery pack (e.g., battery pack 320) at and/or below upper temperature threshold 424. As such, the current can be reduced to zero at temperatures at and/or above upper temperature threshold 424.

In some embodiments, if a temperature of a battery pack enters over-temperature region 430 (e.g., exceeds upper temperature threshold 424), the battery pack can halt current charging until the battery pack reaches a lower temperature threshold, such as lower temperature threshold 422. For instance, in the event that a temperature enters over-temperature region 430, the temperature-current curve can shift to cooldown region 425 (e.g., in place of temperature-inverse region 420) to allow a temperature of the battery pack to cool to reach lower temperature threshold 422. For instance, the battery pack may request a minimus current until a temperature of the battery pack reaches lower temperature threshold 422, at which point the battery pack may resume following temperature-inverse region 420.

Figure 5:
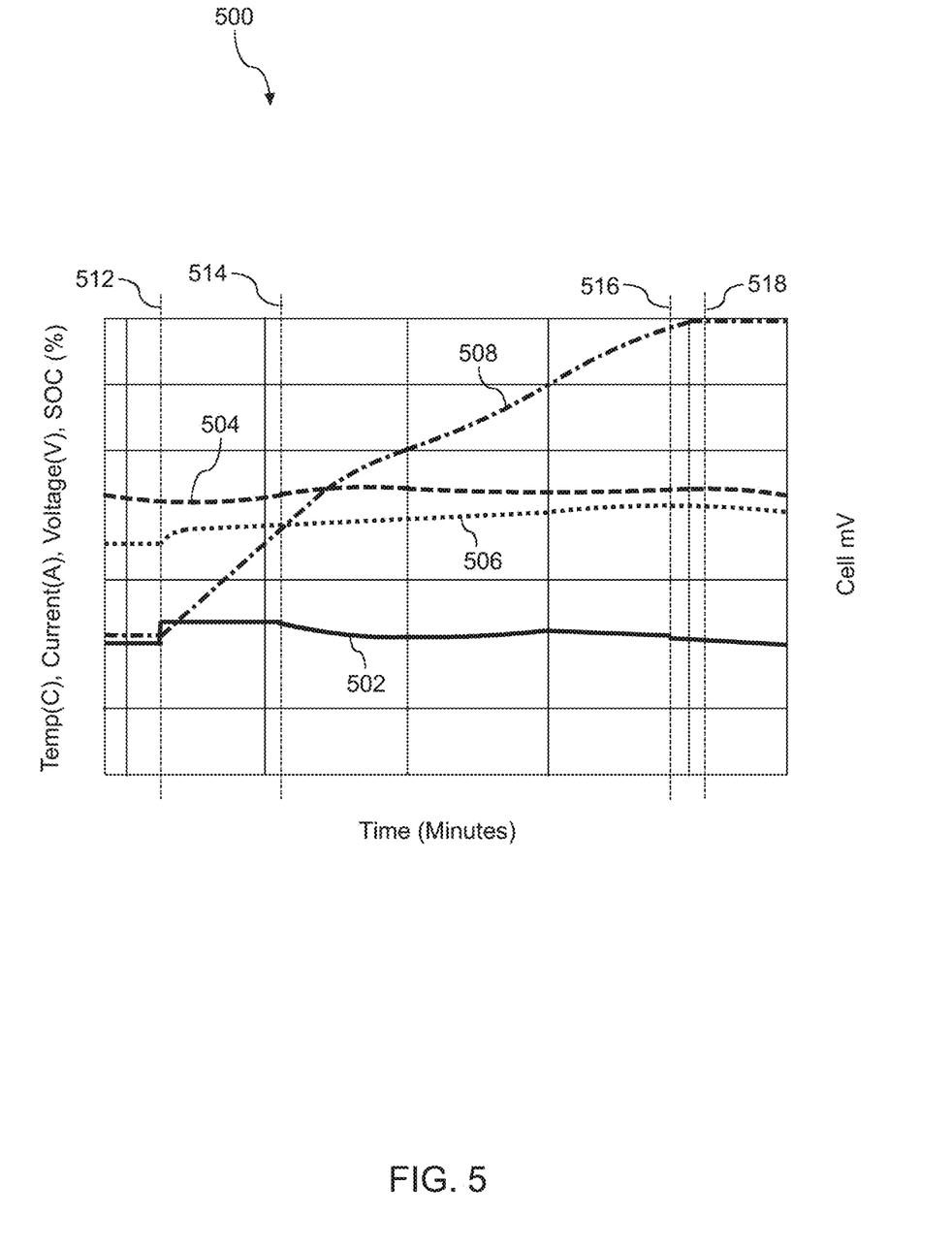
FIG. 5 illustrates a plot of battery parameters during a charging process according to example embodiments of the present disclosure.

FIG. 5 illustrates a plot 500 of battery parameters during a charging process according to example embodiments of the present disclosure. For instance, plot 500 includes current curve 502. Current curve 502 illustrates an amount of current (e.g., in amperes) that is provided to one or more cells (e.g., from a battery charger) over time. Additionally, plot 500 includes temperature curve 504. Temperature curve 504 illustrates temperature (e.g., in degrees Celsius) of a battery pack (e.g., of at least one cell) that is being charged over time. Additionally, plot 500 includes voltage curve 506. Voltage curve 506 illustrates a voltage (e.g., in volts) of the battery pack (e.g., from one or more cells in the battery pack) over time. Additionally, plot 500 includes state of charge curve 508. State of charge curve 508 illustrates a state of charge (e.g., in percentage) of the battery pack over time. For instance, a state of charge of 100% indicates that the battery is completely charged, while a state of charge of 0% indicates that the battery is depleted.

Plot 500 depicts a charging process for a battery over various stages in time. For instance, at time 512, the battery pack can begin charging. For instance, as illustrated by current curve 502, a nonzero amount of current can be provided to the battery pack at time 512 to begin charging the battery. Prior to time 512, the battery pack may have been previously depleted or otherwise used such that the battery pack is at an incomplete charge. For instance, as illustrated by state of charge curve 508, the battery pack can initially have a state of charge that is near 0%. Furthermore, use of the battery pack may have heated the battery pack (e.g., the one or more cells) above room temperature or other ambient temperature of the battery pack.

At time 514, the battery pack can begin reducing the current based on the increasing temperature of the battery pack. For instance, as illustrated, the "full" amount of current provided by the charger from time 512 to time 514 may cause the temperature of the battery pack to increase as a result of the current. At time 514, the temperature of the battery pack may first exceed a lower temperature threshold such that the maximum charging current now is related to the temperature of the battery pack by an inverse functional relationship. Additionally and/or alternatively, the temperature may have exceeded the lower temperature threshold before time 514, but the reduced maximum current from the temperature may have been higher than a current limit from another factor and/or a maximum current that the battery charger is capable of providing. As illustrated between time 514 and time 516 by current curve 502, the current provided to the battery pack can be varied inversely with temperature based on an inverse functional relationship such that the battery pack can avoid an over-temperature condition.

At time 516, the battery pack can be charged in a constant voltage manner. For instance, prior to time 516, the battery pack may have been charged in a specified-current manner, such as a "constant current" manner where the current can nonetheless vary based on temperature of the battery pack, as described herein. Generally, however, the voltage of the battery pack is expected to increase prior to time 516. At 516, however, the battery pack can instead be charged in a constant voltage manner to maintain the voltage at which the battery pack is at time 516 (e.g., a rated voltage for the battery pack). As illustrated at time 516 by voltage curve 506 and state of charge curve 508, the battery is not quite at 100% state of charge. Thus, the battery can continue charging with constant voltage until time 518, at which the battery completes charging. Subsequent to time 518, current may still be provided to the battery to maintain a 100% state of charge.

Figure 6:
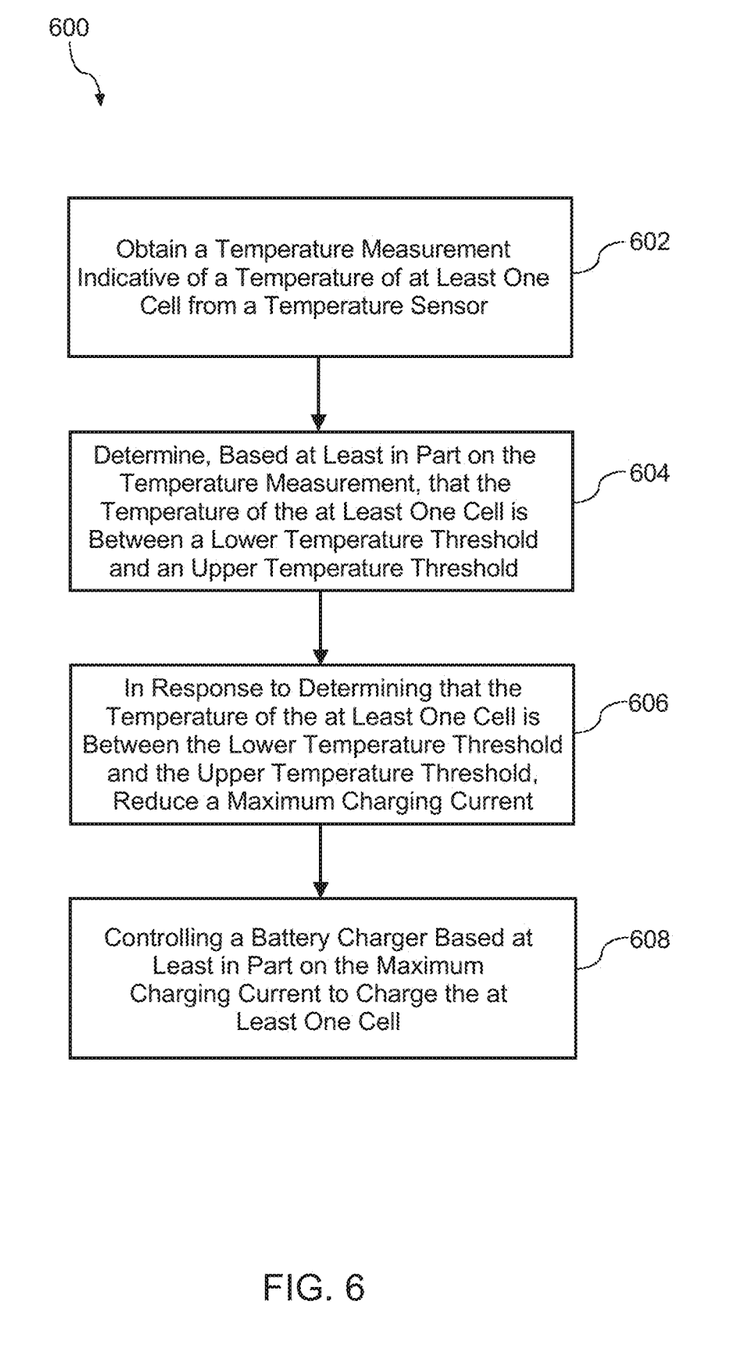
FIG. 6 illustrates a flow chart diagram of an example method for charging a battery pack to avoid an over-temperature condition according to example embodiments of the present disclosure.

FIG. 6 illustrates a flow chart diagram of an example method 600 for charging a battery pack to avoid an over-temperature condition according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 can be implemented by any suitable computing device in communication with a battery pack and/or battery charger, such as battery pack 320 and/or battery charger 310 of FIG. 3. As an example, some of all steps of the method 600 can be implemented by battery controller 324 of FIG. 3. As another example, some or all steps of the method 600 can be implemented by charger controller 314 of FIG. 3. The method 600 can be performed by any suitable computing structures, such as, for example, volatile and/or non-volatile computer readable media, processor(s), programmable logic circuits and/or programmable logic arrays, application-specific integrated circuits, and/or other suitable computing systems.

The method 600 can include, at 602, obtaining a temperature measurement indicative of a temperature of at least one cell from a temperature sensor. The temperature measurement can be indicative of a temperature of the battery pack (e.g., a temperature of the at least one cell). For instance, in some embodiments, the temperature measurement can be communicated from the temperature sensor to a controller, such as a battery controller and/or charger controller. In one example embodiment, a single temperature sensor is configured to obtain a temperature measurement of one cell to determine the temperature of the battery pack. For example, the temperature measurement of a single cell can be extrapolated to represent the temperature of the battery pack. Other suitable temperature measurement configurations may be employed in accordance with example embodiments of the present disclosure.

Additionally and/or alternatively, in some embodiments, the temperature measurement may be made available to the battery charger. For instance, in some embodiments, the temperature measurement may be available at a temperature measurement terminal at the battery pack. For instance, when the battery pack is received at a device (e.g., the battery charger), the temperature measurement terminal may convey a temperature measurement signal (e.g., a digital and/or analog signal) that is descriptive of the temperature measurement to the device to which the battery pack is coupled (e.g., the battery charger). The battery charger (e.g., charger controller) may obtain the temperature measurement from the temperature measurement terminal.

The method 600 can include, at 604, determining, based at least in part on the temperature measurement, that the temperature of the at least one cell is between a lower temperature threshold and an upper temperature threshold. For instance, the lower temperature threshold can be at a temperature at which it becomes desirable to begin reducing current to the battery pack to avoid the over-temperature condition. Generally, the lower temperature threshold can be any suitable temperature and may be a temperature that is less than (e.g., about 10 degrees Celsius less than) the upper temperature threshold. Furthermore, in some embodiments, the upper temperature threshold can be at an upper temperature limit, such as a temperature at which an over-temperature condition occurs. The controller can determine that the temperature of the at least one cell is between a lower temperature threshold and an upper temperature threshold in any suitable manner, such as, for example, by a threshold comparison. Additionally and/or alternatively, the determination may be performed as a result of inputting the temperature into a mathematical model, for example.

Additionally and/or alternatively, The method 600 can include, at 606, in response to determining that the temperature of the at least one cell is between the lower temperature threshold and the upper temperature threshold, reducing a maximum charging current. For instance, reducing the maximum charging current can include reducing a maximum charging current that is requested from a battery charger (e.g., by a charging current request). According to example aspects of the present disclosure, reducing the maximum charging current can include reducing the maximum charging current based at least in part on an inverse functional relationship between the temperature measurement and the maximum charging current. For instance, the inverse functional relationship can provide that a maximum charging current will decrease as temperature of the at least one cell increases. Additionally and/or alternatively, the maximum charging current can be allowed to recover (e.g., increase) as the temperature decreases (e.g., after reducing). In some embodiments, the inverse functional relationship can be a monotonically decreasing relationship. For example, in some embodiments, the inverse functional relationship can be a linearly decreasing relationship. For example, the maximum charging current can decrease linearly with respect to increasing temperature. Other suitable functional relationships can be employed in accordance with example aspects of the present disclosure.

In some embodiments, the inverse functional relationship can be or can include a mathematical model or function. For example, a computing system can compute the maximum charging current based on a formula or mathematical model. As another example, the inverse functional relationship can be or can include a lookup table. For example, the maximum charging current can be retrieved from a lookup table where temperature is provided to the lookup table as input. Other suitable systems for utilizing an inverse function relationship (e.g., thresholding) can be employed in accordance with example aspects of the present disclosure. As one example, the maximum charging current can be determined with respect to a temperature-based current limit from a temperature-current curve. The temperature-current curve can be stored in non-transitory computer-readable media, such as, for example, flash memory, RAM, ROM, EEPROM, hard disk memory, solid state memory, and/or any other suitable memory. For instance, in some embodiments, the curve can be stored as a lookup table, mathematical relationship or model, or other suitable representation.

In some embodiments, the maximum charging current can be based on various other current limits established with respect to other factors of the battery pack. For example, the current limit(s) can be established by various criteria of the battery, such as, but not limited to, state of charge, battery voltage, cell voltage, charging type (e.g., constant current vs. constant voltage), charging status, charging progression, etc. One of these current limits can be established with respect to temperature of the battery pack, such as based on the inverse functional relationship between temperature and charging current. For example, the lowest current limit may be used as the maximum charging current.

Additionally and/or alternatively, The method 600 can include, at 608, controlling a battery charger based at least in part on the maximum charging current to charge the one or more cells. For instance, in some embodiments, the battery charger, such as a supply of the battery charger, can be configured to provide an amount of voltage and/or current to battery pack that is equal to or less than the maximum charging current. For instance, in some embodiments, the charger controller can adjust characteristics of one or more digital signals, such as pulse width modulated (PWM) signals, to configure an amount of current and/or voltage and/or power supplied by the battery charger (e.g., the supply). For instance, the controller can adjust the voltage and/or current at the battery pack by adjusting duty cycle, frequency/period, etc. of one or more pulse width modulation circuits at the battery charger. As another example, in some embodiments, charger controller can adjust other components of the battery charger, such as variable components, such as variable resistors, varactors, switches, etc., to configure an amount of current and/or voltage and/or power supplied by the battery charger. For example, a charger controller can be configured to adjust the power signal from the battery charger (e.g., for charging the cell(s)) based at least in part on the maximum charging current (e.g., from the battery controller and/or as determined at the charger controller) as described herein.

In some embodiments, controlling the battery charger based at least in part on the maximum charging current can include requesting, from the battery charger, the maximum charging current for charging the one or more cells. For instance, in some embodiments, the battery controller can determine a charging current request. The charging current request can specify a requested amount of current to be provided to the battery for charging the battery, such as the maximum charging current. The charging current request can be communicated to the battery charger, such as a charger controller. In some embodiments, the maximum charging current can be periodically requested from the battery charger. For instance, the maximum charging current may be determined and requested at regular intervals to ensure that the current is updated as necessary. For example, the maximum charging current can be requested in periodic intervals, such as at set time intervals, including regular intervals and/or irregular intervals, in response to stimuli, etc.

After receiving the charging current request, the charger controller can configure a battery charger (e.g., a supply) to deliver the amount of current that is specified by the charging current request to the battery pack (e.g., cells). As one example, a battery pack and/or a battery charger can include one or more charging terminals configured to provide electrical connection between the one or more cells and the battery charger, such as between the one or more cells and the supply. In some embodiments, the charging current request is periodically communicated to the battery charger. For example, the charging current request can be communicated in periodic intervals, such as at set time intervals, including regular intervals and/or irregular intervals, in response to stimuli, etc.

Figure 7:
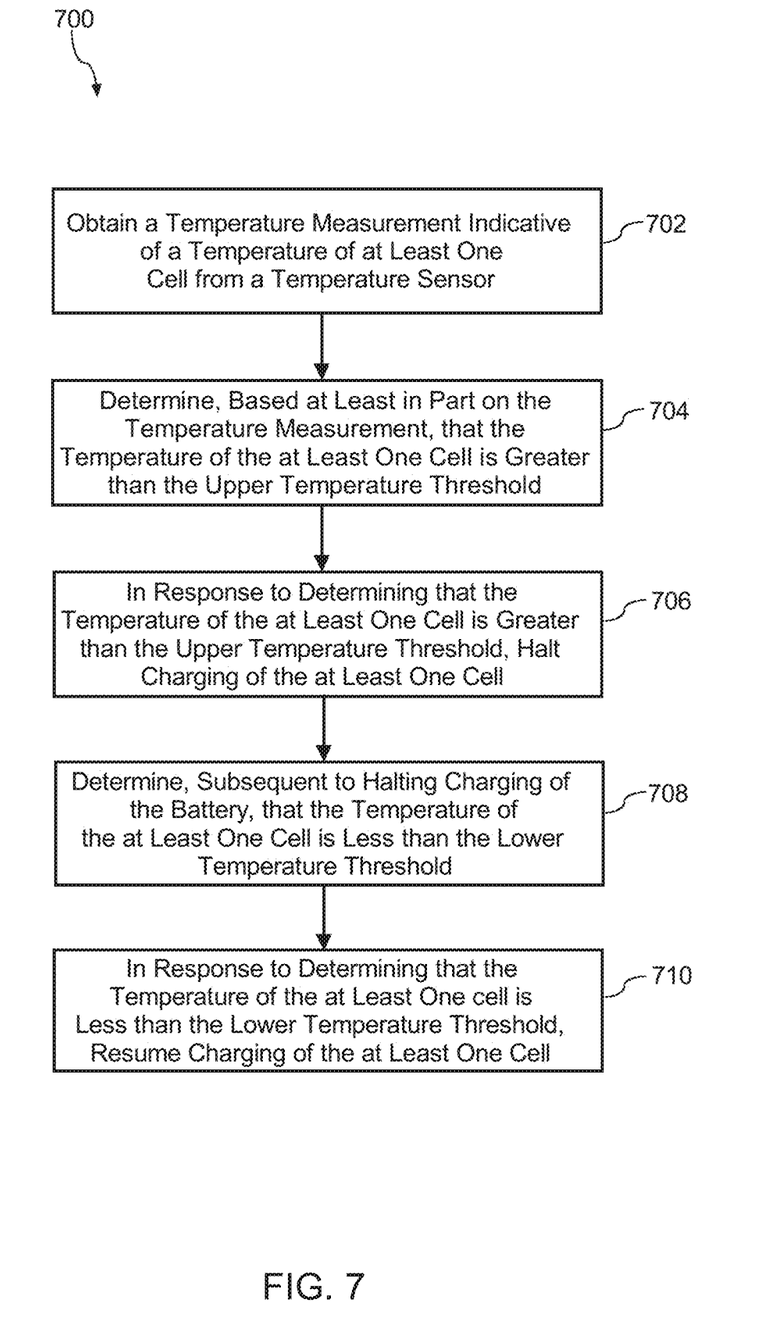
FIG. 7 illustrates a flow chart diagram of an example method for charging a battery pack to mitigate an over-temperature condition according to example embodiments of the present disclosure.

FIG. 7 illustrates a flow chart diagram of an example method 700 for mitigating an over-temperature condition according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 can be implemented by any suitable computing device in communication with a battery pack and/or battery charger, such as battery pack 320 and/or battery charger 310 of FIG. 3. As an example, some of all steps of the method 700 can be implemented by battery controller 324 of FIG. 3. As another example, some or all steps of the method 700 can be implemented by charger controller 314 of FIG. 3. The method 700 can be performed by any suitable computing structures, such as, for example, volatile and/or non-volatile computer readable media, processor(s), programmable logic circuits and/or programmable logic arrays, application-specific integrated circuits, and/or other suitable computing systems.

The method 700 can include, at 702, obtaining a temperature measurement indicative of a temperature of at least one cell from a temperature sensor. The temperature measurement can be indicative of a temperature of the battery pack (e.g., a temperature of the at least one cell). For instance, in some embodiments, the temperature measurement can be communicated from the temperature sensor to a controller, such as a battery controller and/or charger controller. In one example embodiment, a single temperature sensor is configured to obtain a temperature measurement of one cell to determine the temperature of the battery pack. For example, the temperature measurement of a single cell can be extrapolated to represent the temperature of the battery pack. Other suitable temperature measurement configurations may be employed in accordance with example embodiments of the present disclosure.

Additionally and/or alternatively, in some embodiments, the temperature measurement may be made available to the battery charger. For instance, in some embodiments, the temperature measurement may be available at a temperature measurement terminal at the battery pack. For instance, when the battery pack is received at a device (e.g., the battery charger), the temperature measurement terminal may convey a temperature measurement signal (e.g., a digital and/or analog signal) that is descriptive of the temperature measurement to the device to which the battery pack is coupled (e.g., the battery charger). The battery charger (e.g., charger controller) may obtain the temperature measurement from the temperature measurement terminal.

The method 700 can include, at 704, determining, based at least in part on the temperature measurement, that the temperature of the at least one cell is greater than the upper temperature threshold. For example, the controller can compare the temperature of the cell(s) to the upper temperature threshold. If the temperature meets or exceeds the upper temperature threshold, it can be desirable to halt charging the battery pack. For instance, in response to determining that the temperature of the one or more cells is greater than the upper temperature threshold, the method 700 can include, at 706, halting charging of the battery pack. For instance, halting charging of the battery pack can include requesting a minimus current from the battery charger while charging is halted. The minimus current can be a current that is at or near zero amps, such as less than about 0.1 amps, such as 0 amps. For example, halting charging of the battery pack can include communicating a halt current request to the battery charger, where the halt current request includes a request for zero amps or near-zero amps.

The method 700 can include, at 708, determining, subsequent to halting charging of the battery, that the temperature of the at least one cell is less than the lower temperature threshold. For instance, the temperature of the at least one cell being less than the lower temperature threshold can generally be indicative that charging can safely be resumed. In response to determining that the temperature of the one or more cells is less than the lower temperature threshold, The method 700 can include, at 710, resuming charging of the battery pack. For instance, once the battery pack reaches the lower temperature threshold, the controller can resume determining a maximum charging temperature based on a temperature measurement, as described herein.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

What is claimed is:

1. A battery pack charging system, comprising:
 a battery pack comprising:
  one or more cells; and
  at least one temperature sensor configured to obtain a temperature measurement indicative of a temperature of at least one cell of the one or more cells;
 a battery charger configured to receive the battery pack; and
 a controller communicatively coupled to the battery pack and the battery charger, the controller configured to:
  obtain the temperature measurement from the at least one temperature sensor;
  determine, based at least in part on the temperature measurement, that the temperature of the at least one cell is between a lower temperature threshold and an upper temperature threshold;
  in response to determining that the temperature of the at least one cell is between the lower temperature threshold and the upper temperature threshold, reducing a maximum charging current based at least in part on an inverse functional relationship between the temperature measurement and the maximum charging current, wherein the maximum charging current is reduced across at least a temperature-inverse region;
  determine, based at least in part on the temperature measurement, that the temperature of the at least one cell is greater than the upper temperature threshold;
  in response to determining that the temperature of the at least one cell is greater than the upper temperature threshold, halt charging of the battery pack;
  subsequent to halting charging of the battery pack, determine that the temperature of the at least one cell is at or below the lower temperature threshold within the temperature-inverse region;
  in response to determining that the temperature of the at least one cell is at or below the lower temperature threshold, resume charging of the battery pack by reducing the charging current based in part on the inverse functional relationship between the temperature measurement and the maximum charging current; and
  controlling the battery charger based at least in part on the maximum charging current to charge the one or more cells.

2. The battery pack charging system of claim 1, wherein, to halt charging of the battery pack, the controller is configured to:
 request a minimus current from the battery charger while charging is halted.

3. The battery pack charging system of claim 2, wherein the minimus current comprises a current that is less than about 0.1 amps.

4. The battery pack charging system of claim 1, wherein the maximum charging current is requested in periodic intervals from the battery charger.

5. The battery pack charging system of claim 1, wherein the battery charger is removably coupled to the battery pack.

6. The battery pack charging system of claim 1, wherein the inverse functional relationship comprises a monotonically decreasing relationship.

7. The battery pack charging system of claim 1, wherein the inverse functional relationship comprises a linearly decreasing relationship.

8. The battery pack charging system of claim 1, further comprising:
 a supply configured to provide a power signal to the one or more cells.

9. The battery pack charging system of claim 8, wherein the supply is a direct current (DC) supply.

10. The battery pack charging system of claim 8, wherein the power signal is a current signal.

11. The battery pack charging system of claim 1, wherein the one or more cells comprise one or more lithium-ion cells.

12. A battery controller, comprising:
 a communication terminal communicatively coupled to a battery pack and a battery charger; and
 one or more processors configured to perform operations, the operations comprising:
  obtaining a temperature measurement from the battery pack;
  determining, based at least in part on the temperature measurement, that a temperature of the battery pack is between a lower temperature threshold and an upper temperature threshold;
  in response to determining that the temperature of the battery pack is between the lower temperature threshold and the upper temperature threshold, reducing a maximum charging current based at least in part on an inverse functional relationship between the temperature measurement and the maximum charging current, wherein the maximum charging current is reduced across at least a temperature-inverse region;
  determining, based at least in part on the temperature measurement, that the temperature of the battery pack is greater than the upper temperature threshold;
  in response to determining that the temperature of the battery pack is greater than the upper temperature threshold, configuring the battery charger to halt charging of the battery pack;
  determining, subsequent to configuring the battery charger to halt charging of the battery pack, that the temperature of the battery pack is at or below the lower temperature threshold;
  in response to determining that the temperature of the battery pack is at or below the lower temperature threshold, configuring the battery charger to resume charging of the battery pack by reducing the charging current based in part on the inverse functional relationship between the temperature measurement and the maximum charging current; and
  controlling an amount of charge provided to the battery pack based at least in part on the maximum charging current.

13. The battery controller of claim 12, wherein the inverse functional relationship comprises a monotonically decreasing relationship.

14. The battery controller of claim 12, wherein the inverse functional relationship comprises a linearly decreasing relationship.

15. The battery controller of claim 12, wherein, to control the amount of charge provided to the battery pack, the operations comprise:

configuring the battery charger to provide the maximum charging current to the battery pack.

16. The battery controller of claim 12, wherein, to configure the battery charger to halt charging of the battery pack, the operations comprise:
configuring the battery charger to provide a minimus current to the battery pack.

17. The battery controller of claim 16, wherein the minimus current comprises a current that is less than about 0.1 amps.

18. A method for charging a battery pack, the method comprising:
obtaining, from at least one temperature sensor, a temperature measurement indicative of a temperature of at least one cell of the battery pack;
determining, based at least in part on the temperature measurement, that the temperature of the at least one cell is greater than an upper temperature threshold;
in response to determining that the temperature of the at least one cell is greater than the upper temperature threshold, halting charging of the at least one cell;
subsequent to halting charging of the at least one cell, determining that the temperature of the at least one cell is at or below a lower temperature threshold; and
in response to determining that the temperature of the at least one cell is at or below the lower temperature threshold, resuming charging of the at least one cell of the battery pack by reducing the charging current based at least in part on an inverse functional relationship between the temperature measurement and a maximum charging current.

* * * * *